United States Patent [19]
Turner

[11] Patent Number: 5,671,936
[45] Date of Patent: Sep. 30, 1997

[54] SHOCK ABSORBING BICYCLE FRAME APPARATUS

[76] Inventor: David Roy Turner, 11 Condor Dr., Eagle, Colo. 81631

[21] Appl. No.: 518,607

[22] Filed: Aug. 10, 1995

[51] Int. Cl.[6] .................................................. B62K 25/28
[52] U.S. Cl. ........................................................ 280/284
[58] Field of Search ............................... 280/281.1, 283, 280/284, 285, 274, 275

[56] References Cited

U.S. PATENT DOCUMENTS

| 644,787 | 3/1900 | Williams . | |
|---|---|---|---|
| 973,217 | 10/1910 | Sager | 280/284 |
| 1,062,800 | 5/1913 | Sager | 280/284 |
| 1,101,614 | 6/1914 | Bramham . | |
| 1,152,773 | 9/1915 | White | 280/284 |
| 2,283,671 | 5/1942 | Finlay et al. | 280/284 |
| 4,582,343 | 4/1986 | Waugh | 280/284 |
| 4,653,604 | 3/1987 | De Cortanze | 180/227 |
| 5,335,929 | 8/1994 | Takagaki et al. | 280/284 X |
| 5,354,085 | 10/1994 | Gally | 280/285 |
| 5,385,361 | 1/1995 | De Bei | 280/284 |

FOREIGN PATENT DOCUMENTS

| 176755 | 4/1953 | Germany | 280/284 |
|---|---|---|---|
| 503380 | 12/1954 | Italy | 280/284 |
| 109894 | 10/1917 | United Kingdom | 280/284 |
| 678292 | 9/1952 | United Kingdom | 280/284 |

*Primary Examiner*—Kevin Hurley
*Attorney, Agent, or Firm*—Gene Scott - Patent Law & Venture Group

[57] ABSTRACT

A shock absorbing bicycle frame apparatus includes a bicycle frame assembly having a seat tube, upper frame tube, lower frame tube and handle bar tube welded in a generally triangular construction. A shock absorber attachment means extends forwardly from the seat tube at a position below the upper frame tube, and a shock mounting bridge is pivotally engaged with the shock absorber attachment means. A rear wheel support fork consists of a pair of parallel, spaced apart connector rods mounted at a lower end portion to opposing sides of a rear wheel axle and at an upper end portion to the shock mounting bridge. A shock absorbing means is mounted to the shock mounting bridge so as to extend forwardly away from the seat tube. The shock absorbing means includes a shock rod that extends from and is pivotally engaged to the seat tube ears so that road shock energy delivered to the rear wheel is transferred through the rear wheel support fork to the shock absorbing means for absorbing shocks. A pair of rear wheel stabilizer rods extend between and are pivotally connected with the lower end portion of the connector rods and the seat tube in a position adjacent to the lower frame.

9 Claims, 2 Drawing Sheets

SHOCK ABSORBING BICYCLE FRAME APPARATUS

BACKGROUND OF THE INVENTION

1. Field of the Invention

This invention relates generally to shock absorbing devices for bicycles or motorcycles, and more particularly to an improved bicycle shock absorbing system designed so that an arm of the shock absorbing means is as short as possible.

2. Description of Related Art

Invention and use of suspension devices are well known to the public, as they are frequently employed to absorb shock in a wide variety of different vehicles, including cars, trucks and motorcycles. While such devices are also utilized in bicycles, they have been plagued by numerous problems and have typically had limited effectiveness in absorbing large shocks incurred by the rear bicycle wheel. In the past this has not, for the most part, posed significant limitations, as bicycles have been generally designed for use on relatively smooth surfaces. More recently, however, "mountain bikes" designed to be used in increasingly rugged terrain have become popular. Although these bicycles have a modified frame and handle bar structure, the suspension devices utilized are incapable of effectively absorbing larger shocks incurred over irregular ground surfaces.

An example of such prior art suspension devices is seen in Lawwill U.S. Pat. No. 4,789,174. Lawwill discloses a bicycle in which a rear suspension includes swing arms, control arms and hub plates connected to the seat riser tube of the frame in a trapezoidal arrangement. The swing arms, control arms and hub plates are configured to balance the forces applied to the rear wheel by the chain during pedaling so as to prevent energy absorbing movement of the rear suspension as the result of such pedaling. A shock absorber is also connected to the swing arms to absorb shocks during riding.

Waugh U.S. Pat. No. 4,582,343 discloses a lightweight rear-wheel suspension for a bicycle. The suspension device includes a triangulated main frame, a rear wheel support frame such as a rear fork rotatably supporting a rear wheel and mounted to the main frame so that it pivots about the foot crank rotational axis, and a spring-loaded hydraulic shock absorber for damping the relative movement of the rear wheel. The shock absorber has its outer housing incorporated as a rigid structural element of the triangulated main frame, its sliding piston assembly connected to the rear wheel support frame via a linkage system which converts the arcuate motion of the rear wheel support frame into linear motion in line with the linear motion of the sliding piston assembly. A rider-controlled valve for hydraulically locking and unlocking the shock absorber is also included so as to allow the rear suspension to function both in a suspended mode and a rigid mode. However, Waugh includes no triangulation to counter torsion forces generated by the rear wheel. This makes the single rear fork of the device either very heavy, or else very expensive to produce with a weight light enough to counter these twisting forces.

De Bei U.S. Pat. No. 5,385,361 discloses a shock absorber device comprising a flexible absorber placed within the tube which supports the sleeve holding the saddle. The rear fork is pivoted corresponding to its front extremities to the lower part of the front tubular structure of the frame. The two arms of the fork, corresponding to their intermediate part, are pivoted to a pin fixed to the extremity of the shaft of the shock absorber. Two slits are formed in the tube so that the pin may slide through the slits. Other similar shock absorbing devices are disclosed in Bramham U.S. Pat. No. 1,101,614, Ashton U.S. Pat. No. 1,283,030, Williams U.S. Pat. No. 644,787 and de Cortanze U.S. Pat. No. 4,653,604.

However, these prior art devices have a number of problems. Firstly, all of the prior art devices mount the shock unit on the back of the seat tube. This positioning not only causes the device to gather mud, but it also prevents optimal positioning of the rear wheel. In some devices, such as that of Bramham, the location of the rear shock absorber is quite dangerous, while other devices, such as that of Ashton, put considerable linkage behind the seat tube riser in a way that is incompatible with the geometry of current frame designs.

Another significant disadvantage of the prior art devices is that they are linkage activated, with the shock absorber mounted vertically, as seen in Lawwill and Waugh. This configuration is far less effective than would be a horizontally mounted shock absorber positioned directly on the suspension fork.

Several of the prior art devices are also significantly flawed in that their design interferes with a long post inserted into the seat riser tube. Obstructing this tube with the shock apparatus inhibits the adjustability of the seat post into the seat tube, thus limiting the size of the rider able to use the particular bicycle. This problem is particularly acute in De Bei and Waugh.

Yet another disadvantage of the prior art devices is that the distance between the rear wheel axle and the suspension mounting point to the main frame is relatively long, which reduces the stiffness and strength of the device.

Thus, there is a clear need for an improved shock absorbing system. The preferred system positions the shock apparatus in front of the seat tube rather than behind it. This system further provides for direct attachment of the key elements of the system rather than through a linkage, and, in no way hinders the clearance within the seat post.

The present invention fulfills these needs and provides further related advantages as described in the following summary.

SUMMARY OF THE INVENTION

The present invention is an improved shock absorbing bicycle frame apparatus particularly designed for use in absorbing shock incurred by the rear wheel of a bicycle. It provides a frame assembly including a seat tube and a handle bar tube that are approximately vertically oriented, and an upper and a lower frame tube that extend between and are welded to the seat and handle bar tubes so that the tubes form a generally triangular arrangement. A pair of spaced apart ears are fixed to and extend forwardly from the seat tube at a position below the upper frame tube, and a shock mounting bridge is pivotally engaged with the ears. A rear wheel support fork consists of a pair of parallel, spaced apart connector rods with an axle engagement means included on a lower end portion so as to allow each of the connector rods to be mounted onto opposing sides of a rear wheel axle of the bicycle. The connector rods extend at an upward angle from the axle, with an upper end portion of each of the connector rods terminating at and rigidly fixed to the shock mounting bridge. A shock absorbing means is mounted to the shock mounting bridge, the absorbing means including a shock rod pivotally engaged to and extending forwardly from the seat tube ears so that road shock energy delivered to the axle engagement means is transferred by the rear wheel support fork to the shock absorbing means, thereby absorbing shocks incurred by the rear wheel of the bicycle.

Thus, it is an object of the present invention to significantly absorb road shock energy so as to provide for a smoother, more comfortable bicycle ride.

It is a key inventive feature of the present invention to mount the shock absorbing means in a position forward of the seat tube, rather than behind it, as is common with prior art devices. This inventive new placement of the shock absorbing means is a significant improvement over prior art devices in that in the forward position the shock absorbing means does not interfere with the movement of the rear wheel, as is frequently the case with prior art devices. In addition, the forward placement of the shock absorbing means is a substantial improvement in that it does not tend to collect as much mud or dirt during riding as is common with rear mounted components.

The present inventive shock absorbing bicycle frame apparatus is also an improvement over prior art devices in that it is constructed in such a way as not to hinder the lowering of the seat post into the seat tube, a problem common with many of the prior art designs. This is an important benefit of the present invention, as it allows the bicycle seat to be freely adjusted, thus accommodating riders of all different leg lengths and thereby greatly improving the marketability of the device.

Still further, with the present invention the distance between the rear wheel axle and the suspension mounting point to the main frame is substantially shorter than with any other strut style rear suspension for bicycles in the present state of the art. Thus it is an object of the present inventive shock absorbing apparatus to increase the stiffness and strength of the device with the least cost in weight. Additionally, with the present invention the tubes that form the main triangular arrangement are not broken in any way, thus providing a device that maintains maximum strength and stiffness with lowest cost and weight.

In order to stabilize the rear wheel of the bicycle, the present invention employs a pair of rear wheel stabilizer rods. The rear wheel stabilizer rods are positioned in spaced apart, side by side, parallel alignment, each rod extending between the lower portion of one of the connector rods and the lower end of the seat tube in a position adjacent to the lower frame tube. The stabilizer rods are pivotally connected to both the connector rods and the seat tube so as to rotate relative to both. Thus, it is an object of the present invention to provide a shock absorbing apparatus in which the rear wheel is free to move independently of the main bicycle frame in a vertical direction, but is restrained from independent horizontal motion.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a shock absorbing frame apparatus. In such drawings.

DETAILED DESCRIPTION OF THE PREFERRED EMBODIMENT

Figure 1:
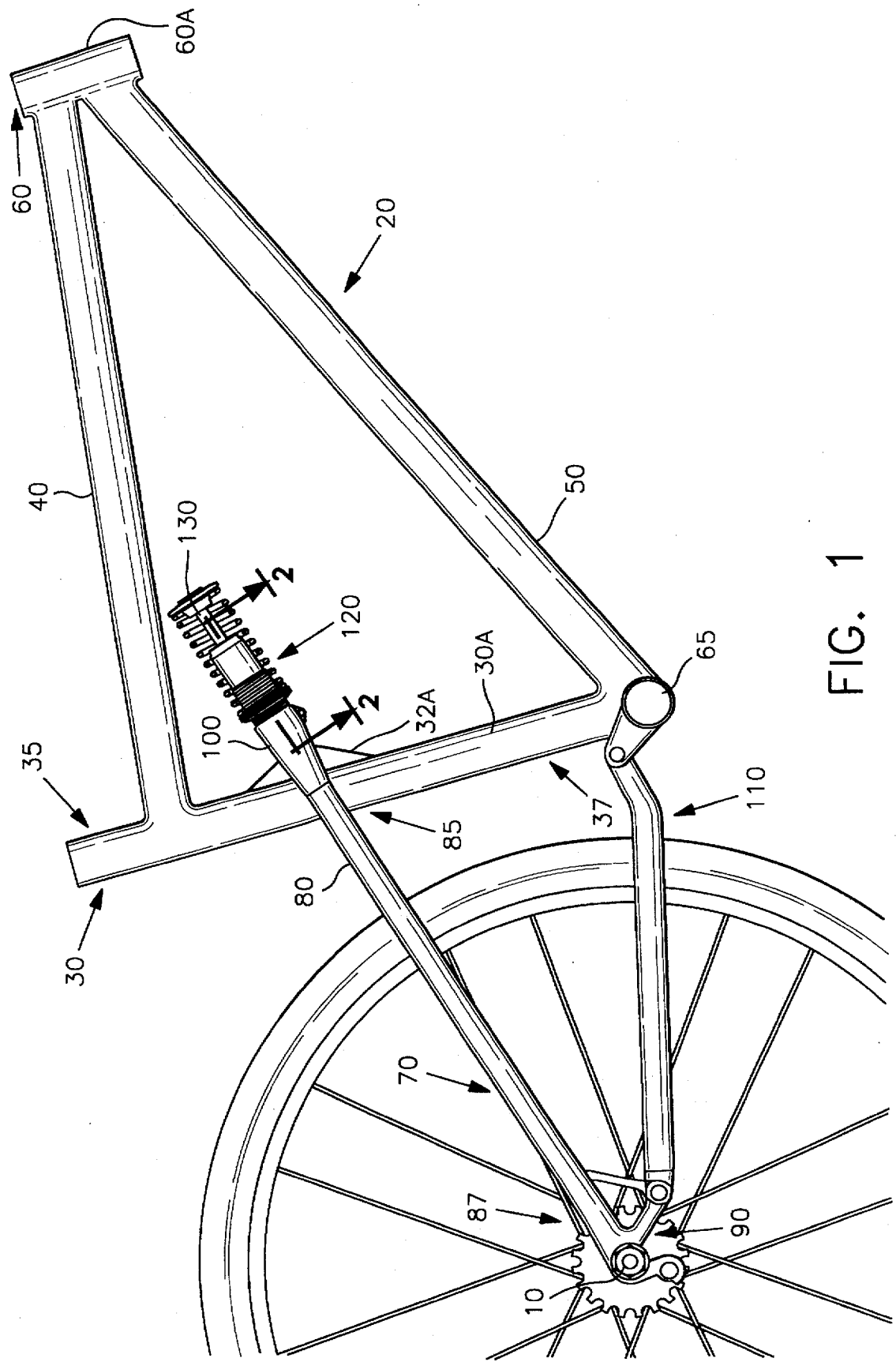
FIG. 1 is a side elevational view of a preferred embodiment of the present invention, particularly showing the preferred configuration of the frame assembly, rear wheel support fork and rear wheel stabilizer rods.
Figures 2, 3:
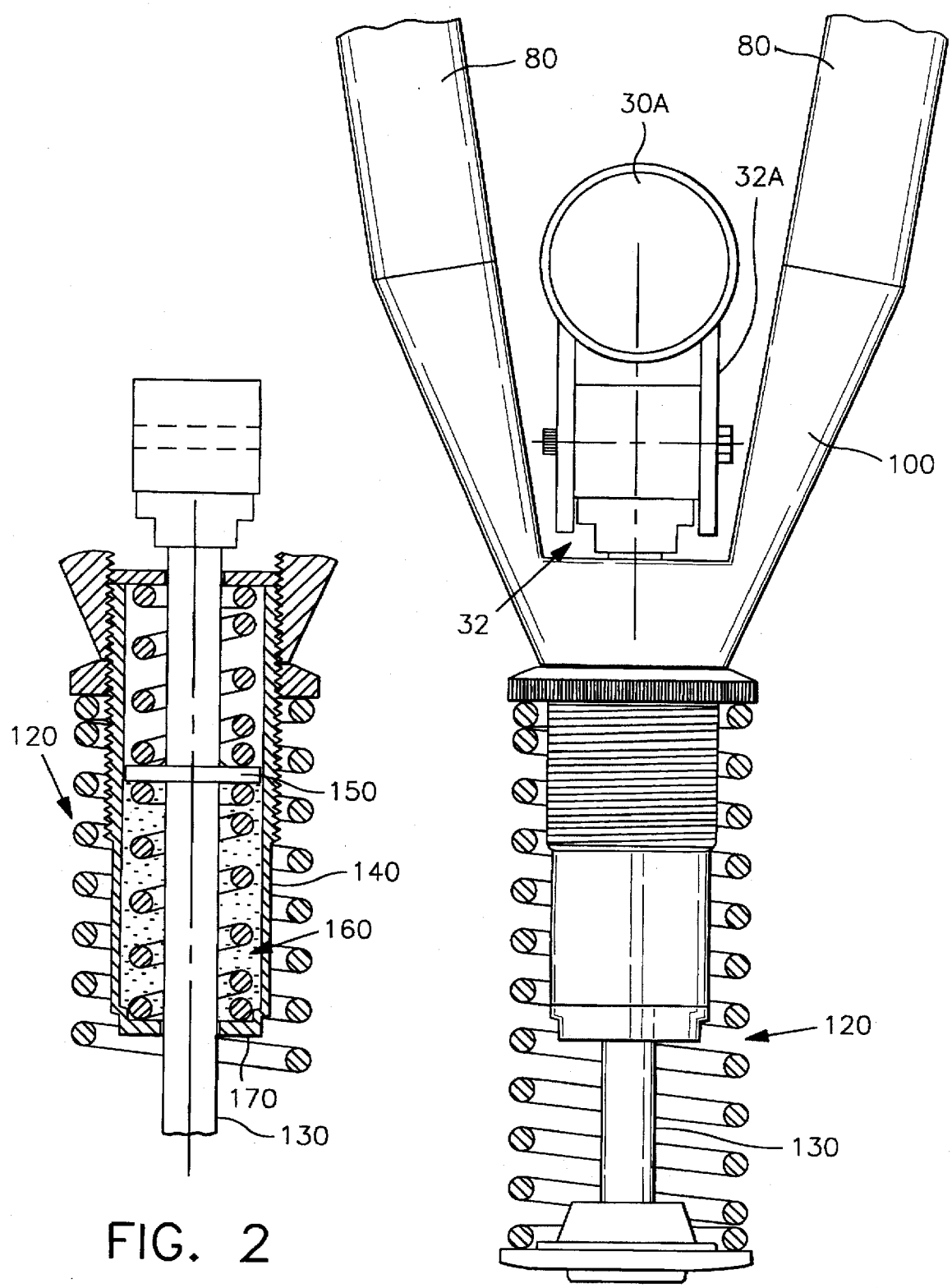
FIG. 2 is a cross-sectional view thereof taken along line 2—2 of FIG. 1, particularly showing the components of a shock absorbing means of the invention.
FIG. 3 is a top plan view of the present invention, particularly showing the shock absorbing means and a shock mounting bridge.

FIGS. 1–3 show a shock absorbing bicycle frame apparatus that includes a bicycle frame assembly 20, a rear wheel support fork 70, a pair of rear wheel stabilizer rods 110 and a shock absorbing means 120.

The bicycle frame assembly 20 includes a means 30 for supporting a bicycle seat, preferably including a seat tube 30A, a means 60 for supporting a handle bar, preferably including a handle bar tube 60A, and a means 65 for rotationally engaging a crank shaft, which is not shown in FIG. 1. The frame assembly 20 also preferably includes an upper frame tube 40 and a lower frame tube 50, these tubes being welded together with the seat tube 30A and the handle bar tube 60A so as to form a generally triangular arrangement, as clearly seen in FIG. 1. As illustrated, the seat tube 30A and the handle bar tube 60A are approximately vertically oriented, with the upper frame tube 40 extending approximately horizontally between an upper end 35 of the seat tube and the handle-bar tube 60 and the lower frame tube 50 angled upwardly between a lower end 37 of the seat tube 30A and the handle bar tube 60.

As illustrated in FIG. 3, a shock absorber attachment means 32 is fixed to the frame assembly 20. Preferably, the shock absorber attachment means 32 includes of a pair of spaced apart ears 32A that extend forwardly from the seat tube 30A at a position below the upper frame tube 40.

The rear wheel support fork 70 preferably consists of a pair of parallel, spaced apart connector rods 80 that each terminate with a lower end portion 87. An axle engagement means 90 is included on the lower end portion 87 of each connector rod 80 so as to allow for convenient mounting of the connector rods 80 onto opposing sides of a rear wheel axle 10 of the bicycle. As illustrated, the rods 80 extend at an upward angle from opposing sides of the axle 10, with an upper end portion 85 of each of the connector rods 80 terminating at a shock mounting bridge 100 which is pivotally engaged, through a shock absorbing means 120, with the ears 32A.

The rear wheel stabilizer rods 110 are positioned in spaced apart, side by side, parallel alignment, with one rod positioned on each side of the rear wheel axle 10. Each of the rods 110 extends between the lower portion 87 of one of the connector rods 80 and the lower end 37 of the seat tube 30A in a position adjacent the lower frame tube 50. Preferably, the stabilizer rods 110 are pivotally connected to both the connector rods 80 and the seat tube 30A so as to rotate relative to both. This configuration restrains the rear wheel from independent horizontal motion, yet allows the rear wheel to move in a vertical direction independently of the bicycle frame assembly 20.

The shock absorbing means 120 is mounted to the shock mounting bridge 100 and interconnected between the bridge 100 and the shock absorber attachment means 32 so as to extend forwardly away from the seat tube 30A. The shock absorbing means 120 preferably includes a shock rod 130 that is pivotally engaged at one end with the seat tube ears 32A, as best seen in FIG. 3.

There are numerous different shock absorbing means 120 that may be successfully implemented within the scope and spirit of the present invention, as such means are well known in the art. In one preferred embodiment, illustrated in FIG. 2, the shock absorbing means 120 provides a cylindrical shell 140 that is coaxially aligned with the shock rod 130 so that the shell is moveable along the rod, and thus constrained to linear longitudinal motion. In this embodiment, as shown in FIG. 2, a disk-shaped force plate 150 is preferably rigidly fixed to the rod 130, and a bias means 160 is positioned between the rod 130 and the shell 140, extending between the force plate 150 and an end plate 170 of the shell 140 such that the bias means 160 is biased to dampen energy and motion between the rod 130 and the shell 140.

The bias means 160 may be either a fluid, a coil spring, a fluid and coil spring combination, a resilient elastomeric body or any other such shock absorbing entity. While there are numerous other possible shock absorbing means 120 that may be successfully implemented within the scope of the present invention, such shock absorbing means 120 are well known in the art and are therefore not more thoroughly detailed. An additional shock absorbing means 160A may be used to dampen and control hyperextension of the rear wheel such as when the bicycle is air-borne. Finally, an external shock absorbing means 160B may be used to supplement or replace the shock absorbing means within the shell 140. Any one or more than one of the above shock absorbing devices may be used to enhance the ability of the bicycle to traverse rough terrain.

In use, when the rear wheel of the bicycle incurs rugged terrain or the like, the shock energy is transferred from the rear wheel to the axle engagement means 90, up the rear wheel support fork 70, to the shock mounting bridge 100 and through the shock rod 130. This causes the shell 14 of the shock absorbing means 120 to move linearly along the shock rod 130, thus pushing the force plate 150 forward and compressing the bias means 160 so as to effectively absorb the shock energy. When a fluid is used in conjunction with other shock absorbing elements, it provides a dampening effect in that, as force plate 150 moves within shell 140, the fluid is squeezed around the force plate, between it and the side wall of the shell. The fluid's rate of transfer around the force plate 150 determines the reaction speed of the shock absorber.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A shock absorbing bicycle time apparatus comprising:
    a bicycle frame assembly, a rear wheel support fork, and a pair of rear wheel stabilizer rods;
    the bicycle frame assembly including a means for supporting a bicycle seat, a means for supporting a handle bar, a means for rotationally engaging a crank shaft;
    the frame assembly further including a shock absorber attachment means fixed thereto;
    the rear wheel support fork including a pair of connector rods, said rods extending in side by side, spaced apart relationship, at an upward angle, a lower end portion of each of the connector rods having an axle engagement means positioned below the shock absorber attachment means, an upper end portion of each of the connector rods terminating at, joined by, and rigidly fixed to a shock mounting bridge, the bridge positioned forward of the shock absorber attachment means and pivotally engaged therewith;
    the pair of rear wheel stabilizer rods, each extending, below the rear wheel support fork between, and pivotally connected with at least one of the lower end portions of one of the connector rods and the frame assembly;
    a shock absorbing means mounted to the shock mounting bridge and interconnected between said bridge and the shock absorber attachment means such that shock energy delivered to the axle engagement means is transferred by the rear wheel support fork to the shock absorbing means for absorbing shocks.

2. The apparatus of claim 1 wherein the bicycle frame includes a seat tube, an upper frame tube, a lower frame tube, and a handle bar tube, the tubes interconnected in welded construction with the upper frame tube extending in a near horizontal orientation between, and interconnecting, an upper end of the near vertically oriented seat tube with the handle-bar tube, the lower frame tube angled upwardly between, and interconnecting, a lower end of the seat tube with the handle bar tube, so that the seat tube, and the upper and lower frame tubes form a generally triangular arrangement.

3. The apparatus of claim 2 wherein the shock absorber attachment means includes a pair of spaced apart ears extending forwardly from the seat tube and fixed thereto at a position below the upper frame tube.

4. The apparatus of claim 1 wherein the shock absorbing means provides a cylindrical shell coaxially aligned with a shock rod, the shell being movable along the rod and constrained thereby to linear longitudinal motion, and further including a bias means positioned between the rod and the shell and biased to act to dampen energy and motion between the rod and the shell.

5. The apparatus of claim 1 wherein the rod including a disk shaped force plate rigidly fixed thereto, the bias means being a coil spring engaged by the disk for compressing the coil spring in dampening motion thereof.

6. The apparatus of claim 1 wherein the bias means is at least one coil spring.

7. The apparatus of claim 1 wherein the bias means is a fluid.

8. The apparatus of claim 1 wherein the bias means is at least one coil spring and a fluid.

9. The apparatus of claim 1 wherein the bias means is at least one resilient elastomeric body.

* * * * *